United States Patent Office 3,450,611
Patented June 17, 1969

3,450,611
PROCESS FOR PREPARING COMPOUNDS CONSISTING ONLY OF CARBON, FLUORINE AND OXYGEN
Marco Loffelholz, Novara, and Adolfo Pasetti and Dario Sianesi, Milan, Italy, assignors to Montecatini Edison S.p.A., Milan, Italy
No Drawing. Filed Sept. 2, 1966, Ser. No. 576,846
Claims priority, application Italy, Sept. 6, 1965, 19,831/65
Int. Cl. C08f 1/24; B01j 1/10
U.S. Cl. 204—158       10 Claims Our invention relates to a new process for the synthesis of epoxides of perfluoro-olefins and of polymers containing only carbon, fluorine and oxygen atoms and characterized by the presence of peroxide groups. The process of our invention uses high energy ionizing radiations to promote the reaction between one or more perfluoro-olefins and molecular oxygen.

Copending patent application Ser. No. 446,292, filed on Apr. 7, 1965, describes a method to obtain perfluoro-olefin epoxides and a new class of polymeric substances consisting of carbon, fluorine and oxygen atoms, the reaction of a perfluoro-olefin having at least three carbon atoms, or of a mixture of perfluoro-olefins, with oxygen in the presence of U.V. radiations having a wave-length comprised between 1000 and 4000 A. The reaction is preferably carried out at a temperature between −100° C. and +25° C. by passing molecular oxygen or a gas containing molecular oxygen into a liquid phase consisting of the mentioned perfluoro-olefins, either in the pure state or in solution of an inert organic solvent, irradiated with ultra-violet light. By this reaction, besides considerable amounts of epoxides of the perfluoro-olefin, liquid or semisolid polymeric products in predominant proportins were obtained. These products have a chemical structure which can be expressed by the formula $(MO_x)_n$, wherein M is a perfluorinated unit from the starting perfluoro-olefin, O is oxygen, $x$ is a number which can have any value comprised between 1 and 2, $n$ is an integer which indicates the degree of polymerization and can have a value comprised between 2 and 100, and even higher. The chain of these products was characterized by ethereal or peroxide bridges, in a ratio between them highly variable in accordance with certain reaction conditons. The end groups of the molecules essentially consisted of acid groups of the —COF or —COOH type.

Applicants have found that they can produce similar products, in practically analogous conditions, using high energy ionizing radiations to promote the reaction between oxygen and the perfluoro-olefin. More particularly, it has been found that, when a liquid phase of a perfluoro olefin having 3 to 10 carbon atoms is subjected to gamma radiations and simultaneously a gaseous oxygen flow, at about atmospheric pressure, is fed into the same liquid phase, a reaction takes place similar to the photochemical one described above. This reaction leads to the formation of two different products. The first product is the epoxide of the perfluoro-olefin. The second product, which normally represents the main product, consists of a liquid or semisolid polymer containing units of the perfluoro-olefin bound together by ethereal or peroxide bridges with the end or terminal groups consisting of acid groups. This product, is therefore, completely analogous in structure to that obtainable in certain conditions by the photochemical reaction. The ratio between the number of peroxide bridges and the number of ethereal bridges of the chain, however, varies only within considerably restricted limits.

Using perfluoropropylene as starting olefin, the polymeric products, which can be obtained under gamma radiation, has a structure corresponding to the formula $(C_3F_6O_x)_n$, where the value of $x$ is between 1.05 and 1.5 and usually between 1.1 and 1.40. Part of the chemically bound oxygen is present in the molecules as peroxide oxygen. The amount of peroxide oxygen can be iodemetrically determined. The molecular weight of these polymeric products is between $10^3$ and $10^4$. The average molecular weight of these products can be determined by titration of the end acid groups of the chain with alkali.

The present invention has an object a process for the preparation of the epoxides of perfluoro-olefins and of polymers containing ethereal and peroxide bridges, consisting only of carbon, fluorine and oxygen, wherein a perfluoro-olefin, having from 3 to 10 carbon atoms, or a mixture of said perfluoro-olefins with another perfluoro-olefin, is reacted in the liquid phase with molecular oxygen, at a temperature from −100° C. to +25° C., under the action of high energy ionizing radiation consisting of gamma rays, neutrons or a combination thereof.

The high energy radiations can be emitted by natural radioactive substances, such as radium and related products, or by radioactive fission by-products from nuclear reactors. These by-products contain elements between atomic numbers 27 and 63 and their chemical compounds. These radioactive elements are formed during the fission of uranium, thorium and other elements fissionable in a nuclear reactor. In the present invention, materials made radioactive by means of exposure to a flow of neutronic radiation, such as Cobalt-60, Europium 152 and Europium 154 emitting gamma rays, can also be used. A nuclear reactor can also be used as a mixed source of gamma and neutron rays.

The recoil energy of the fission fragments (168 mev.) can also be used in the present invention. Therefore, the sources of this type of energy, such as Uranium 235, its alloys and its compounds can be used, if contemporaneously subjected to a radiation with fast neutrons. Gamma rays, in particular, are preferred for this type of reaction. Such rays can come from radioactive decay of certain radioisotopes such as: Radium 226, Radium A, Radium B, Radium C, Radium D, Thallium 210, Cobalt 60, Cesium 137, Europium 152, Europium 154, Cesium 134, Cerium 144, Silver 110, Tullium 170, Tantalum 182, Scandium 46, Terbium 160, Iridium 192, or from products containing these elements. The gamma rays can also come from exhausted fuel elements of a nuclear reactor.

The process of this invention is applied to perfluoro-olefins having from 3 to 10 carbon atoms or to their mixtures. Particularly suitable are: perfluoropropylene, perfluorobutene-1, perfluoroisobutene, perfluoropentene-1, perfluorohexene-1 etc., mixtures thereof or mixtures of one of these perfluoro-olefins with tetrafluoroethylene. Olefins generally having the same chemical behavior as the perfluoro-olefins, such as for instance the ω-hydro- and the ω-chloro-perfluoro-olefins-1 can also be employed.

The process is carried out at a temperature comprised between −100° C. and +25° C., preferably at a temperature comprised between −90° C. and the boiling temperature of the liquid phase containing the perfluoro-olefin. The working pressure is preferably about atmospheric pressure, although pressures comprised between 0.1 and 10 atmospheres are also suitable.

An advantageous method to carry out the present process is to use a solvent for the reacting perfluoro-olefin. This solvent is present in amounts from 100 to 0.1 parts per part by weight of the perfluoro-olefin and can be selected indifferently from all the substances being liquid under the reaction conditions and inert to the combined action of the oxygen and the radiations. The solvent employed in the reaction can be a saturated perfluorinated or perhalogenated hydrocarbon or containing a high proportion of combined halogen atoms. In this instance, the polymeric product of the reaction is normally soluble in the same solvent.

In contrast to what happens when using U.V. radiations, the continuous and progressive action of the gamma rays in the same synthesis conditions does not cause a considerable modification in the chemical form of the fluoroxygenated polymers produced in the reaction. However, as it will be seen in the examples, a certain variation in the oxidizing power of the fluoroxygenated polymer can be obtained by choice of reaction temperature and the use of or not of a solvent. The ratio between the main reaction products, i.e. between the epoxide and the polymer, can also be varied by acting upon some of the reaction conditions. By diluting the oxygen with other inert gases, it is possible to direct the reaction preferentially towards the formation of epoxide.

The polymers obtained according to the process of the present invention form a class of peroxide substances which can find useful application in all those fields where normally peroxide substances are used. Moreover, they can be transformed into polymeric substances of different characteristics, e.g. by heating or by treatment, preferably in solution in a perfluoro-olefin, with U.V. radiation, in the absence of oxygen. By these treatments the peroxide polymers are transformed into polymers which do not contain any more oxidizing oxygen atoms and which have an exceptional stability to heat and to chemical reagents. The substances thus obtained can, by decarboxylation of the end acid groups, for example, by heating between 150° and 350° C. with alkali, be further transformed into neutral oily liquid compounds, extremely stable and useful as fluids for heat transmission, lubricants, dielectric liquids, etc. Other uses of the products of the invention are in the field of the surface-active and of the water- and oil-repellent agents.

The following examples are to illustrate and not limit the invention.

Example 1

An apparatus is employed consisting of a cylindrical glass reactor having a capacity of about 200 cc., provided with a reflux condenser kept at —80° C. and gas inlet dipping pipe for the introduction of oxygen. The non-reacted oxygen, which leaves the reactor through the reflux condenser, is led to a battery of washing bottles containing an aqueous KOH solution having a concentration of 20%, then dried on $CaCl_2$ and collected in a gasometer and recycled back to the reactor by means of a circulation pump. Oxygen, equivalent to that consumed in the reaction, is fed to the gasometer.

218 g. of perfluoropropene are introduced into the reactor, which is kept at boiling temperature. Oxygen is then circulated and the reaction mixture is radiated by means of a gamma-ray source consisting of Co 60 having a dose intensity of $7.48 \times 10^{19}$ ev./g.h. After 4 hours the radiation is interrupted, the volatile substances (consisting of perfluoropropene containing 0.16% of epoxide) are removed from the reactor. The residue is 29.7 g. of an oily polymeric substance which presents a centesimal composition equal to $(C_3F_6O_{1.2})_n$. A sample of said substance in $CF_2Cl.CFCl_2$ is iodometrically titrated by means of a solution of NaI in acetic anhydride. An oxidizing power equal to an active-oxygen content of 0.21 atom per $C_3F_6$ unit is obtained. By means of acidimetric titration of the product, an equivalent acidimetric weight of about $1.5 \times 10^3$ is determined.

The quantic yield of this operation has been calculated to be equal to $1.99 \times 10^5$, and the corresponding G value (number of transformed molecules per 100 ev. of absorbed energy), referred to the polymeric compound only, is 161.28.

Example 2

160 g. of perfluoropropene and 27.6 g. of the oily polymer obtained in Example 1 are introduced into the same apparatus described in Example 1. Then circulating nitrogen instead of oxygen, the apparatus is radiated with the already described gamma-ray source, with the same dose intensity, for a period of 4 hours, keeping the perfluoropropene at its boiling temperature.

Upon cessation of the radiation the $C_3F_6$ excess is removed and 25.8 g. of an oily substance is obtained which presents a centesimal composition corresponding to the formula $(C_3F_6O_{1.25})_n$ and which by means of iodometric titration is seen to contain 0.21 atom of active O per $C_3F_6$ unit.

Thus it is seen that subjecting the product obtained in Example 1 to subsequent gamma re-radiation, has no significant effect on the composition.

Example 3

234.6 g. of perfluoropropene are introduced into the reactor of Example 1. Oxygen is then circulated and it is subjected to gamma radiation with Co 60 having a dose intensity of $3.14 \times 10^{19}$ ev./g.h. While keeping the perfluoropropene at its boiling temperature, the radiation is continued for 9h. 30′. In this way, the total dose to which the $C_3F_6$ is subjected is the same as that employed in Example 1. Thereafter, the volatile substances (essentially consisting of $C_3F_6$ containing 0.15% of perfluoropropene epoxide) are removed from the reactor. As a residue 27.7 g. of an oily substance are obtained, which presents a centesimal composition equal to $(C_3F_6O_{1.31})_n$. The substance, by means of iodometric titration in the above-specified conditions, shows an oxidizing power equivalent to 0.22 atom of active oxygen per unit of $C_3F_6$.

This example shows that with an equal total dose, but varying the intensity and the duration, products are obtained, which present an analogous composition. Also the quantic yield, equal to $1.78 \times 10^5$, and the G value, equal to 141.20, have not shown any significant variation.

Into a cylindrical glass reactor, provided with a reflux cooler kept at —80° C., and a dipping pipe for nitrogen bubbling containing a high-pressure Hg-vapor U.V. lamp (type Hanau PL 313), 25 g. of the thus obtained fluoroxygenated polymer are introduced. While cooling the reactor, an additional 150 g. of perfluoropropene are introduced into it. While passing a slow flow of nitrogen through, the reaction mixture is radiated with the above-described lamp immersed in the liquid phase. After a 10 hours radiation, the lamp is turned off, and the $C_3F_6$ present is removed by evaporation. As a residue, a polymeric oil is obtained, which weighs 24 g. and presents, by iodometric titration, the absence of oxidizing power. This product, which has a centesimal composition equal to $(C_3F_6O_{1.05})_n$, can be distilled between 50° and 250° C. at 1 mm. Hg. 22 g. of this oily substance (which presents end acid groups under I.R.) are treated with 1.5 g. of KOH tablets at a temperature of 100°–120° C. for 8 hours. It is then progressively heated and kept at 200° C. for further 8 hours and finally distilled at reduced pressure. 18 g. of an oily product are obtained, which boils between 50° and 250° C. at 1 mm. Hg, with a continuous distillation curve. Under I.R. this product does not present end acid groups, is perfectly neutral and exceptionally stable to the action of heat and of chemical agents.

Example 4

Into the reactor of Example 1, 230 g. of perfluoropropene are introduced. The reactor is kept at —78° C. by a Dry Ice and acetone bath. Oxygen is circulated and the reaction mixture is subjected to radiation for a duration of 9h. 30′ with a dose intensity equal to $3.14 \times 10^{19}$ ev./g.h.

When the radiation is finished the volatile substances (consisting of perfluoropropene containing 0.13% of epoxide) are removed and 13.6 g. of an oily residue are obtained, having a centesimal composition $(C_3F_6O_{1.35})_n$ which, by iodometry, presents an oxidizing power equal to 0.11 atom of active O per $C_3F_6$ unit.

Example 5

The test of Example 1 is repeated except that air is used instead of the oxygen, then reintegrating with pure oxygen that consumed by the reaction. Starting with 330 g. of perfluoropropene and radiating for 4 hours at a temperature of $-29°$ C. with a dose intensity of $7.48 \times 10^{19}$ ev./g.h., 32 g. of an oily substance are obtained, which presents a centesimal composition $(C_3F_6O_{1.30})_n$ and which, by iodometry, presents an oxidizing power equal to 0.17 atoms of active O per $C_3F_6$ unit. The non-reacted perfluoropropene, which is recovered at the end of the radiation, contains 2.8% of epoxide.

This example shows that by diluting the oxygen with inert gases no considerable variations occur in the amount and the characteristics of the polymeric product formed, but that the production of perfluoropropene epoxide increases considerably.

Example 6

127 g. of perfluoropropene and 131 g. of perfluorodimethylcyclobutane are introduced into the reactor of Example 1. Oxygen is then circulated and, while keeping the mixture at a temperature between $-20°$ and $+5°$ C., it is radiated with the above-described gamma source for 4 hours with a dose intensity of $7.48 \times 10^{19}$ ev./g.h. Subsequently, the volatile substances, containing 4.5 g. of $C_3F_6O$ epoxide, are removed. A residue of 25.5 g. of an oily polymeric substance are obtained, which presents a centesimal composition $(C_3F_6O_{1.29})_n$ and which by iodometry shows an oxidizing power equal to 0.24 atom of active O per $C_3F_6$ unit.

Example 7

Into the reactor of Example 1, 114 g. of perfluoropropene and 131 g. of $CF_2Cl.CFCl_2$ are introduced. While circulating oxygen and keeping the mixture at its boiling point, it is radiated with the above-described source of gamma rays for a duration of 4 hours with a dose intensity of $7.48 \times 10^{19}$ ev./g.h. After having removed the volatile substances, essentially consisting of perfluoropropene containing 1.0% of epoxide, and after having removed the solvent, as residue, an oily polymer is obtained which presents a centesimal composition $(C_3F_6O_{1.42})_n$ and an iodometric titer equal to 0.23 atom of active O per $C_3F_6$ unit.

We claim:

1. A process for the preparation of epoxides of perfluoro-olefins and of polymers, containing ethereal and peroxide bridges, only consisting of carbon, fluorine and oxygen, which comprises reacting at least one perfluoro-olefin having from 3 to 10 carbon atoms, with oxygen in the liquid phase, at temperatures from $-100°$ C. to $+25°$ C., under high energy ionizing radiation consisting of gamma rays, neutrons or a combination thereof.

2. The process of claim 1, wherein the reaction is carried out in the presence of a liquid solvent inert both to the oxygen and to the ionizing radiation.

3. The process of claim 2, wherein the solvent is a perfluorinated or perhalogenated hydrocarbon.

4. The process of claim 2, wherein from 100 to 0.1 parts by weight of solvent per one part of reacting perfluoro-olefin are used.

5. The process of claim 1, wherein the reaction is carried out at a temperature between $-90°$ C. and the boiling point of the perfluoro-olefin.

6. The process of claim 1, wherein the starting perfluoro-olefin is perfluoropropylene.

7. The process of claim 1, wherein the ionizing radiation source is Cobalt 60.

8. The process of claim 1, wherein the reaction is carried out at a pressure between 0.1 and 10 atmospheres.

9. The process of claim 8, wherein the reaction is carried out at about atmospheric pressure.

10. The process of claim 1, wherein the starting perfluorinated-olefin is perfluoropropylene, the reaction is carried out in from 100 to 0.1 parts by weight of a solvent selected from perfluorinated and perhalogenated hydrocarbons, the reaction temperature is between $-90°$ C. and $0°$ C., at about atmospheric pressure and the ionizing radiation source is Cobalt 60.

References Cited

UNITED STATES PATENTS

| | | | |
|---|---|---|---|
| 3,151,051 | 9/1964 | Braid et al. | 204—158 |
| 3,242,218 | 3/1966 | Miller | 204—158 X |

HOWARD S. WILLIAMS, *Primary Examiner.*